(12) United States Patent
Kakande

(10) Patent No.: US 9,571,221 B2
(45) Date of Patent: Feb. 14, 2017

(54) OPTICAL NETWORK ARCHITECTURE FOR HIERARCHICAL MODULATION

(71) Applicant: Alcatel-Lucent USA Inc., Murray Hill, NJ (US)

(72) Inventor: Joseph K. Kakande, Jersey City, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 295 days.

(21) Appl. No.: 14/315,454

(22) Filed: Jun. 26, 2014

(65) Prior Publication Data

US 2015/0381303 A1 Dec. 31, 2015

(51) Int. Cl.
| | | |
|---|---|---|
| *H04B 10/04* | (2006.01) | |
| *H04J 14/02* | (2006.01) | |
| *H04B 10/27* | (2013.01) | |
| *H04L 29/06* | (2006.01) | |
| *H04Q 11/00* | (2006.01) | |

(52) U.S. Cl.
CPC ........... *H04J 14/0212* (2013.01); *H04B 10/27* (2013.01); *H04L 65/60* (2013.01); *H04Q 11/0005* (2013.01); *H04Q 2011/0039* (2013.01)

(58) Field of Classification Search
CPC ... H04B 10/505; H04B 10/506; H04B 10/516; H04B 10/548; H04B 10/60; H04B 10/611; H04B 10/612; H04B 10/613; H04B 10/61; H04J 14/02; H04J 14/06; H04Q 11/0005; H04Q 11/0003
USPC ....... 398/77, 78, 79, 83, 182, 183, 192, 193, 398/194, 188, 202, 208, 135, 136, 43, 398/158, 159, 140, 141, 45, 48, 50, 58, 398/49, 51, 54; 375/260, 261, 262, 267, 375/265, 298
See application file for complete search history.

(56) References Cited

U.S. PATENT DOCUMENTS

| | | | |
|---|---|---|---|
| 7,599,446 | B2 | 10/2009 | Moon et al. |
| 8,149,752 | B2 | 4/2012 | Li et al. |
| 8,243,601 | B2 | 8/2012 | Li et al. |
| 8,625,993 | B2 | 1/2014 | Bhatnagar et al. |
| 8,675,754 | B1 | 3/2014 | Yonge, III et al. |
| 2009/0175620 | A1 | 7/2009 | Bhatnagar et al. |
| 2010/0142644 | A1 | 6/2010 | Jiang et al. |

(Continued)

FOREIGN PATENT DOCUMENTS

EP 1406421 A2 4/2004

OTHER PUBLICATIONS

International Search Report and Written Opinion; Mailed Sep. 21, 2015 for corresponding PCT Application No. PCT/US2015/036131.

(Continued)

*Primary Examiner* — Hanh Phan
(74) *Attorney, Agent, or Firm* — Mendelsohn Dunleavy, P.C.; Yuri Gruzdkov

(57) ABSTRACT

A disclosed optical transport system is configured to use hierarchical modulation for better utilization of the available BER margin, e.g., to increase data-transport capacity per carrier wavelength in the system. For example, hierarchical modulation may be used to reduce the number of carrier wavelengths assigned to support a given volume of bidirectional data transport between a set of nodes in an optical backbone network. An embodiment of the disclosed optical transport system can advantageously be constructed by modifying a conventional WDM system, e.g., by adding configurable hierarchical-layer mappers at some of the nodes and modifying some of the ROADMs used therein to enable a drop-and-continue mode of operation.

25 Claims, 6 Drawing Sheets

(56) References Cited

U.S. PATENT DOCUMENTS

| | | | |
|---|---|---|---|
| 2011/0194030 A1* | 8/2011 | Bae .................... | H04H 20/42 |
| | | | 348/723 |
| 2012/0154532 A1 | 6/2012 | Faraj et al. | |
| 2013/0272451 A1 | 10/2013 | Lim et al. | |
| 2013/0286956 A1* | 10/2013 | Lee .................... | H04W 72/10 |
| | | | 370/329 |
| 2016/0043805 A1* | 2/2016 | Kakande ............ | H04B 10/2575 |
| | | | 398/43 |

OTHER PUBLICATIONS

Cao, Pan et al., "Power Margin Improvement for OFDMA-PON Using Hierarchical Modulation," Optics Express, 2013, vol. 21, No. 7, pp. 8261-8268.

Korotky, Steven K. et al., "Expectations of Optical Network Traffic Gain Afforded by Bit Rate Adaptive Transmission," Bell Labs Technical Journal, vol. 14, Issue 4, pp. 285-295, 2010, pp. 285-295.

Sallam, Sara, "16-QAM Hierarchical Modulation Optimization in Relay Cooperative Networks," Masters thesis, Concordia University, Canada, Mar. 2013 (175 pages).

* cited by examiner

FIG. 4

TABLE: SUMMARY OF OPTICAL CONNECTIONS SHOWN IN FIG. 3

| SOURCE NODE | DESTINATION NODE | CARRIER WAVELENGTH | HIERARCHICAL LAYER |
|---|---|---|---|
| $302_1$ | $302_2$ | $\lambda_2$ | ENHANCEMENT |
| $302_1$ | $302_3$ | $\lambda_2$ | BASE |
| $302_2$ | $302_1$ | $\lambda_3$ | ENHANCEMENT |
| $302_2$ | $302_4$ | $\lambda_3$ | BASE |
| $302_3$ | $302_1$ | $\lambda_2$ | NON-HIERARCHICAL |
| $302_4$ | $302_2$ | $\lambda_3$ | NON-HIERARCHICAL |

US 9,571,221 B2

OPTICAL NETWORK ARCHITECTURE FOR HIERARCHICAL MODULATION

BACKGROUND

Field

The present disclosure relates to optical communication equipment and, more specifically but not exclusively, to the use of hierarchical modulation in optical transport systems.

Description of the Related Art

This section introduces aspects that may help facilitate a better understanding of the disclosure. Accordingly, the statements of this section are to be read in this light and are not to be understood as admissions about what is in the prior art or what is not in the prior art.

As used herein, the term "hierarchical modulation" refers to a modulation technique in which multiple data streams are multiplexed into a single symbol stream. In its most basic form, hierarchical modulation has two modulation layers referred to as the base layer and the enhancement layer. In this particular hierarchical-modulation variant, each constellation point of the base layer is split into multiple constellation points using the operative constellation of the enhancement layer. In more-complex hierarchical-modulation schemes, more enhancement layers can be added by further splitting each of the constellation points corresponding to the last enhancement layer using the operative constellation of the next enhancement layer. In the literature, hierarchical modulation may also be referred to as "layered modulation."

SUMMARY OF SOME SPECIFIC EMBODIMENTS

Disclosed herein are various embodiments of an optical transport system configured to use hierarchical modulation for better utilization of the available bit-error-rate (BER) margin, e.g., to increase data-transport capacity per carrier wavelength in the system. For example, hierarchical modulation may be used to reduce the number of carrier wavelengths assigned to support a given volume of bidirectional data transport between a set of nodes in an optical backbone network. An embodiment of the disclosed optical transport system can advantageously be constructed by modifying a conventional wavelength-division-multiplexing (WDM) system, e.g., by adding configurable hierarchical-layer mappers at some of the nodes and modifying some of the reconfigurable optical add-drop multiplexers (ROADMs) used therein to enable a drop-and-continue mode of operation.

According to one embodiment, provided is a system comprising: a first node configured to generate, for transmission over an optical path, a first hierarchically modulated optical signal having a base layer and an enhancement layer; and a second node configured to generate, for transmission over the optical path, a second hierarchically modulated optical signal having a base layer and an enhancement layer, wherein: the first node is further configured to receive data from the second node by demodulating and decoding either the base layer or the enhancement layer of the second hierarchically modulated optical signal; and the second node is further configured to receive data from the first node by demodulating and decoding either the base layer or the enhancement layer of the first hierarchically modulated optical signal.

According to another embodiment, provided is an apparatus comprising: a sorter configured to sort data frames received for transmission over an optical path into a plurality of queues, each of said queues corresponding to a respective destination node coupled to the apparatus through the optical path; a cross-connect switch configured to distribute the data frames from the plurality of queues among a plurality of coding modules; a first coding module of the plurality of coding modules configured to encode the data frames directed thereto by the cross-connect switch for transmission over the optical path using a base layer of a hierarchically modulated optical signal; a second coding module of the plurality of coding modules configured to encode the data frames directed thereto by the cross-connect switch for transmission over the optical path using an enhancement layer of the hierarchically modulated optical signal; and an electronic controller configured to cause the cross-connect switch to change a queue in the plurality of queues from which either the first coding module or the second coding module receives the data frames for encoding.

BRIEF DESCRIPTION OF THE DRAWINGS

Other aspects, features, and benefits of various disclosed embodiments will become more fully apparent, by way of example, from the following detailed description and the accompanying drawings, in which:

FIG. 4 shows a table that provides a summary of the optical connections in the system shown in FIG. 3 according to an embodiment of the disclosure;

DETAILED DESCRIPTION

Various hierarchical-modulation schemes that may be used in some embodiments are disclosed, e.g., in U.S. Pat. Nos. 7,599,446, 8,149,752, and 8,243,601 and U.S. Patent Application Publication Nos. 2013/0272451 and 2010/0142644, all of which are incorporated herein by reference in their entirety. Some embodiments may benefit from the methods and apparatus for optical hierarchical modulation disclosed, e.g., in an article by Pan Cao, Xiaofeng Hu, Zhiming Zhuang, et al., entitled "Power Margin Improvement for OFDMA-PON Using Hierarchical Modulation," published in OPTICS EXPRESS, 2013, Vol. 21, No. 7, pp. 8261-8268, which is incorporated herein by reference in its entirety.

Figure 1:
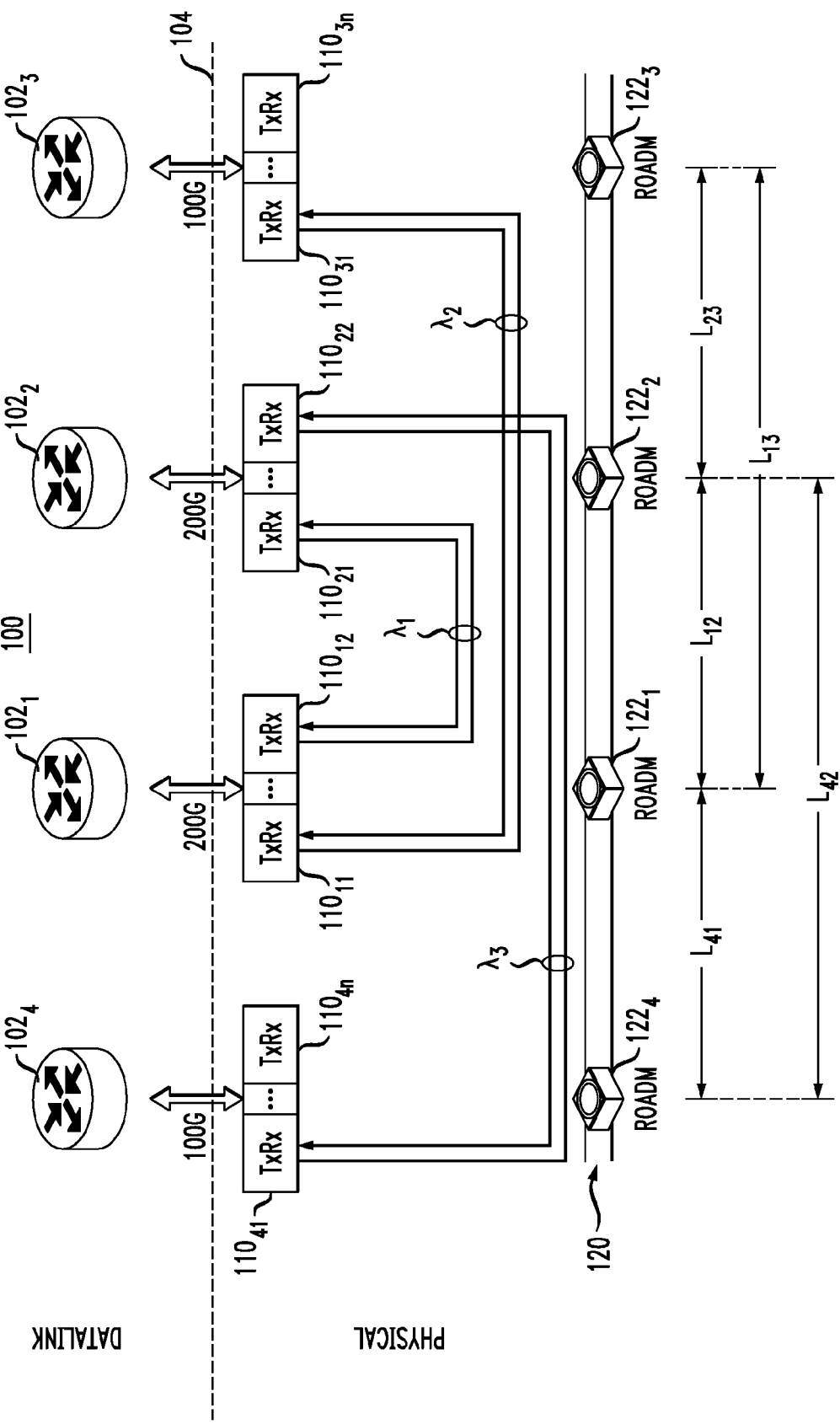
FIG. 1 shows a block diagram of a conventional optical transport system.

FIG. 1 shows a block diagram of a conventional optical transport system 100. For illustration purposes, system 100 is shown and described in reference to the physical and data-link layers only. One of ordinary skill in the art will understand that system 100 may also be configured to perform additional communication functions, e.g., corresponding to other layers of the Open Systems Interconnection (OSI) model.

In an example embodiment, the physical layer of an optical transport system, such as system 100, includes hardware that enables transmission of communication signals between network nodes by providing an optical, electrical, mechanical, and procedural interface between the network nodes and the transmission medium. Within the semantics of the OSI model, the physical layer is considered to be operating to translate logical communications requests from the data-link layer into hardware-specific operations that effect transmission and/or reception of communication signals. The data-link layer of an optical transport system, such as system 100, is the protocol layer that provides functional and procedural means for transporting data between the wide area network served by the physical layer and communication devices on the respective local area network connected to an individual network node. Example data-link protocols may handle local data delivery, data-packet addressing, logical link control, and media access control.

System 100 has four nodes, labeled $102_1$-$102_4$, and is configured to have the following data-transport capacity: (i) 100 Gbit/s for each direction between nodes $102_1$ and $102_2$; (ii) 100 Gbit/s for each direction between nodes $102_1$ and $102_3$; and (iii) 100 Gbit/s for each direction between nodes $102_2$ and $102_4$. To enable this data-transport capacity, the data-link and physical layers in system 100 have an interface 104 configured to support the following uplink and downlink data rates: (i) 200 Gbit/s at node $102_1$; (ii) 200 Gbit/s at node $102_2$; (iii) 100 Gbit/s at node $102_3$; and (iv) 100 Gbit/s at node $102_4$. These data rates are indicated by the correspondingly labeled double-headed arrows in FIG. 1.

At the physical layer, each node $102_i$ (i=1, 2, 3, 4) comprises a respective plurality of optical transceivers (TxRx) $110_{ij}$, where j=1, ..., n, and n is a positive integer greater than one. Each transceiver 110 supports an optical-symbol (baud) rate that is sufficient to handle the above-indicated traffic volumes between nodes $102_1$-$102_4$. In some embodiments, different nodes 102 may have different respective numbers n of transceivers 110.

The physical layer also includes an optical path 120 that connects nodes $102_1$-$102_4$ as indicated in FIG. 1. Optical path 120 comprises conventional reconfigurable optical add-drop multiplexers (ROADMs) $122_1$-$122_4$ that are optically connected to one another by stretches of optical fiber or fiber-optic cable. The fiber link between nodes $102_i$ and $102_k$ has a length $L_{ik}$, where i≠k; i=1, 2, 3, 4; k=1, 2, 3, 4; and $L_{ik}=L_{ki}$. The topology of optical path 120 is such that $L_{13}=L_{12}+L_{23}$ and $L_{42}=L_{41}+L_{12}$. As an example, let us assume, without undue limitation, that the fiber-link lengths are as follows: $L_{41}$=2000 km; $L_{12}$=1000 km; and $L_{23}$=2000 km.

Optical transceivers $110_{12}$ and $110_{21}$ are configured to transmit data between nodes $102_1$ and $102_2$ using a first dedicated carrier wavelength, $\lambda_1$. ROADMs $122_1$ and $122_2$ are configured to add and drop carrier wavelength $\lambda_1$ to/from the wavelength multiplex in optical path 120 as indicated in FIG. 1.

Optical transceivers $110_{11}$ and $110_{31}$ are configured to transmit data between nodes $102_1$ and $102_3$ using a second dedicated carrier wavelength, $\lambda_2$. ROADMs $122_1$ and $122_3$ are configured to add and drop carrier wavelength $\lambda_2$ to/from the wavelength multiplex in optical path 120 as indicated in FIG. 1.

Optical transceivers $110_{41}$ and $110_{22}$ are configured to transmit data between nodes $102_4$ and $102_2$ using a third dedicated carrier wavelength, $\lambda_3$. ROADMs $122_4$ and $122_2$ are configured to add and drop carrier wavelength $\lambda_3$ to/from the wavelength multiplex in optical path 120 as indicated in FIG. 1.

Figure 2:
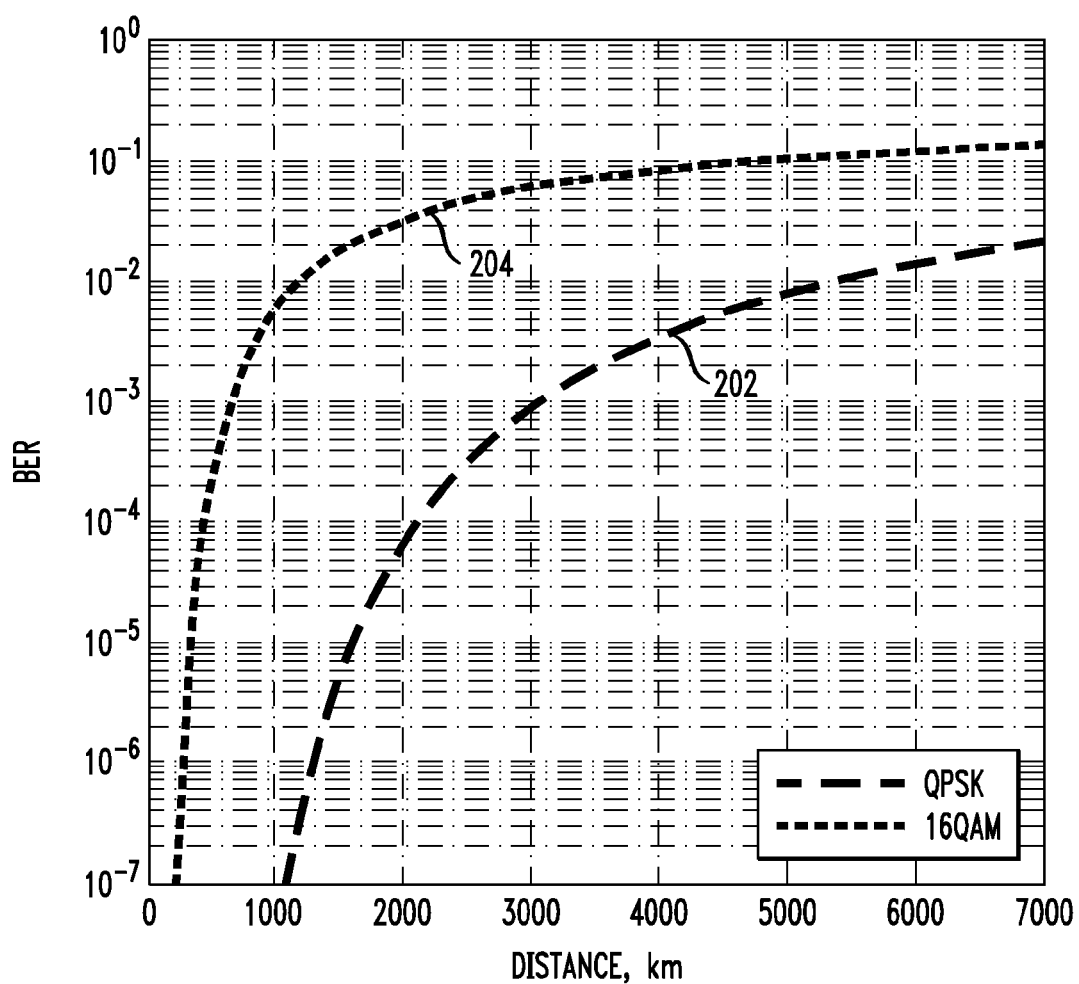
FIG. 2 graphically shows the dependence of bit error rate on the operative non-hierarchical constellation and the length of fiber in the fiber link according to an embodiment of the disclosure.

FIG. 2 graphically shows the dependence of bit error rate (BER) on the operative non-hierarchical constellation and the length of fiber in the fiber link according to an embodiment of the disclosure. More specifically, curves 202 and 204 show the BER corresponding to the QPSK and 16-QAM constellations, respectively. The data shown in FIG. 2 correspond to the following fiber-link characteristics: (i) the fiber link includes a duplex pair of single-mode fiber having an optical loss of 0.17 dB/km; (ii) the fiber link further includes a plurality of regularly spaced erbium-doped fiber amplifiers, each providing an optical gain of about 5 dB, with the spacing of about 100 km between neighboring amplifiers; (iii) the fiber link is dispersion uncompensated and is configured to carry 40 multiplexed modulated carrier wavelengths (channels), each modulated at the rate of 28 Gbaud.

An example transceiver 110 (FIG. 1) may be able to handle a BER of up to about $2 \times 10^{-2}$. However, curve 202 indicates that the QPSK BER corresponding to the fiber-link length of 3000 km is only about $10^{-3}$. Assuming that system 100 is configured to use QPSK modulation, curve 202 suggests that there may be a significant BER margin available on all point-to-point connections in system 100 because 3000 km is the maximum transmission distance therein (see FIG. 1). Embodiments of the disclosure described below in reference to FIGS. 3-6 are directed at utilizing the available BER margin by means of hierarchical modulation. As further explained below, more-efficient utilization of the available BER margin enabled by hierarchical modulation may advantageously be used, e.g., to reduce the number of carrier wavelengths that are used to support a given volume of bidirectional data transport between various nodes in system 100.

Figure 3:
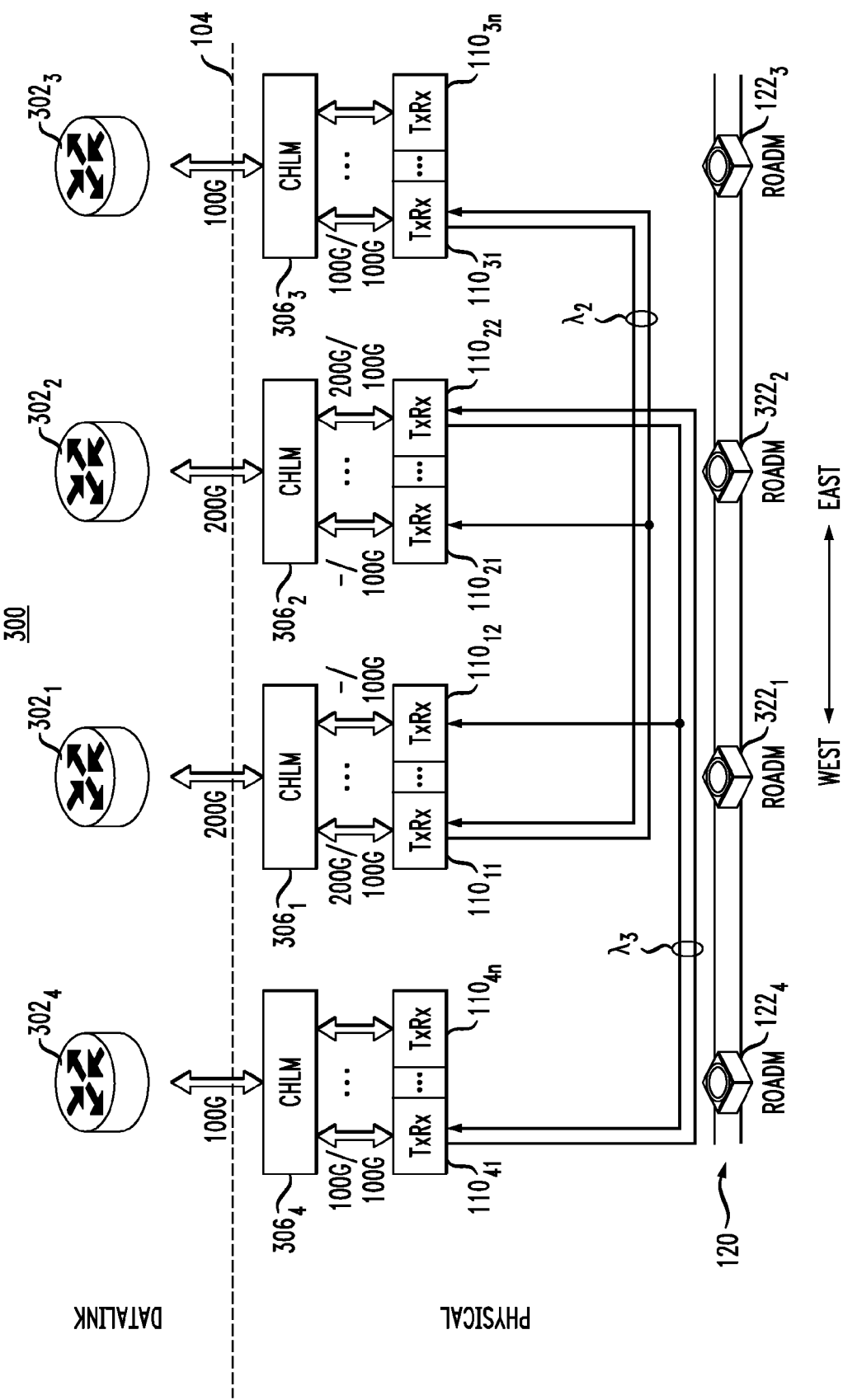
FIG. 3 shows a block diagram of an optical transport system according to an embodiment of the disclosure.

FIG. 3 shows a block diagram of an optical transport system 300 according to an embodiment of the disclosure. An example embodiment of system 300 can be constructed by modifying system 100 (FIG. 1) as further explained below. As such, system 300 uses some of the same elements as system 100, which elements retain the same labels in FIG. 3 as in FIG. 1. The description of the reused elements is not repeated here, and the reader is referred to the foregoing description of those elements given in reference to system 100 and FIG. 1. The following description of system 300 primarily focuses on system modifications and the corresponding modified and/or newly introduced elements. Comparison of FIGS. 1 and 3 reveals that most of the system modifications correspond to the physical layer.

System 300 has four nodes, labeled $302_1$-$302_4$, and is configured for the same optical connections and inter-node data-transport capacity as system 100. One difference between a node 102 in system 100 (FIG. 1) and a node 302 in system 300 (FIG. 3) is that the latter node includes a configurable hierarchical-layer mapper (CHLM) 306 coupled between interface 104 and optical transceivers 110 of the node. In one embodiment, CHLM 306 may be configured to (i) aggregate individual data streams received by node 302, through the data-link layer, from one or more client devices; (ii) encode the aggregated data streams into electrical waveforms that can be used to drive optical modulators in transceivers 110 of node 302 to generate hierarchically modulated optical signals for transmission through optical path 120; (iii) process hierarchically modulated waveforms generated by optical receivers in transceivers 110 of node 302 in response to hierarchically modulated optical signals received through optical path 120 to recover the aggregated data streams encoded thereon; and (iv) de-aggregate the recovered aggregated data streams into individual data streams for one or more client devices served by node 302 through the data-link layer. An example embodiment of CHLM 306 is described in more detail below in reference to FIG. 6.

Another difference between systems 100 and 300 is that the latter system employs ROADMs $322_1$ and $322_2$ in place of ROADMs $122_1$ and $122_2$, respectively, in the former system. ROADM 322 differs from ROADM 122 in that ROADM 322 is capable of a drop-and-continue mode of operation whereas ROADM 122 does not need to and may not be capable of such a mode of operation. A drop-and-continue mode of operation causes ROADM 322 to effectively act, inter alia, as an optical splitter for a selected carrier wavelength such that a first portion of the optical power of that carrier wavelength is dropped by the ROADM from optical path 120 while a second portion of the optical power of that carrier wavelength continues on toward the next ROADM in the optical path. A ROADM that can be used as ROADM 322 in system 300 is disclosed, e.g., in U.S. Pat. No. 8,625,993, which is incorporated herein by reference in its entirety.

In the configuration of system 300 shown in FIG. 3, ROADM $322_1$ operates in a drop-and-continue mode with respect to carrier wavelength $\lambda_3$ travelling in the "east-to-west" direction. ROADM $322_2$ similarly operates in a drop-and-continue mode with respect to carrier wavelength $\lambda_2$ travelling in the "west-to-east" direction. Also note that carrier wavelength $\lambda_1$ is not used in the configuration of system 300 shown in FIG. 3. Hence, transceiver $110_{12}$ in node $302_1$ is (re)configured to receive carrier wavelength $\lambda_3$, and transceiver $110_{21}$ in node $302_2$ is (re)configured to receive carrier wavelength $\lambda_2$. For comparison, recall that both transceiver $110_{12}$ in node $102_1$ and transceiver $110_{21}$ in node $102_2$ are configured to receive carrier wavelength $\lambda_1$ (see FIG. 1). Further note that, in the configuration of system 300 shown in FIG. 3, both transceiver $110_{12}$ in node $302_1$ and transceiver $110_{21}$ in node $302_2$ are not configured to transmit optical signals, which causes the optical transmitters in those transceivers to be idle. In contrast, both transceiver $110_{12}$ in node $102_1$ and transceiver $110_{21}$ in node $102_2$ are configured to transmit optical signals having carrier wavelength $\lambda_1$ (see FIG. 1).

FIG. 4 shows a table that provides a summary of optical connections in the configuration of system 300 shown in FIG. 3 according to an embodiment of the disclosure. The hierarchical constellation used in this particular configuration is a 4/16-QAM hierarchical constellation. One of ordinary skill in the art will understand that, in alternative embodiments, other suitable hierarchical constellations may similarly be used.

In a 4/16-QAM hierarchical constellation, two 4-QAM constellations are superposed such that each constellation point of the first (base layer) 4-QAM constellation is split into four constellation points corresponding to the second (enhancement layer) 4-QAM constellation, for a total of sixteen constellation points. The bits encoded by the first 4-QAM constellation are referred to as the "base bits," and they are common for all constellation points of the 4/16-QAM hierarchical constellation located in the same quadrant of the IQ plane. The bits corresponding to the second 4-QAM constellation are referred to as the "enhancement bits." The enhancement bits may be more vulnerable to noise than the base bits because the separating distance between the constellation points of the second 4-QAM constellation is smaller than the separating distance between the (virtual unsplit) constellation points of the first 4-QAM constellation.

Referring to both FIGS. 3 and 4, transceiver $110_{11}$ in node $302_1$ is configured to modulate carrier wavelength $\lambda_2$ using the 4/16-QAM hierarchical constellation. The base and enhancement bits carried by the modulated carrier wavelength $\lambda_2$ are intended for node $302_3$ and node $302_2$, respectively. As indicated above, ROADM $322_2$ operates in a drop-and-continue mode with respect to carrier wavelength $\lambda_2$, which causes both nodes $302_2$ and $302_3$ to receive the modulated carrier wavelength $\lambda_2$. Transceiver $110_{21}$ in node $302_2$ is configured to demodulate carrier wavelength $\lambda_2$ to recover the enhancement bits and reconstruct the corresponding data stream. CHLM $306_2$ in node $302_2$ then appropriately de-aggregates the reconstructed data stream into sub-streams, and node $302_2$ directs the resulting sub-streams to one or more client devices served by node $302_2$. Transceiver $110_{31}$ in node $302_3$ is configured to demodulate carrier wavelength $\lambda_2$ to recover the base bits and reconstruct the corresponding data stream. CHLM $306_3$ in node $302_3$ then appropriately de-aggregates the reconstructed data stream into sub-streams, and node $302_3$ directs the resulting sub-streams to one or more client devices served by node $302_3$.

Transceiver $110_{22}$ in node $302_2$ is configured to modulate carrier wavelength $\lambda_3$ using the 4/16-QAM hierarchical constellation. The base and enhancement bits carried by the modulated carrier wavelength $\lambda_3$ are intended for node $302_1$ and node $302_4$, respectively. As indicated above, ROADM $322_1$ operates in a drop-and-continue mode with respect to carrier wavelength $\lambda_3$, which causes both nodes $302_1$ and $302_4$ to receive the modulated carrier wavelength $\lambda_3$. Transceiver $110_{12}$ in node $302_1$ is configured to demodulate carrier wavelength $\lambda_3$ to recover the enhancement bits and reconstruct the corresponding data stream. CHLM $306_1$ in node $302_1$ then appropriately de-aggregates the reconstructed data stream into sub-streams, and node $302_1$ directs the resulting sub-streams to one or more client devices served by node $302_1$. Transceiver $110_{41}$ in node $302_4$ is configured to demodulate carrier wavelength $\lambda_3$ to recover the base bits and reconstruct the corresponding data stream. CHLM $306_4$ in node $302_4$ then appropriately de-aggregates the reconstructed data stream into sub-streams, and node $302_4$ directs the resulting sub-streams to one or more client devices served by node $302_4$.

In one embodiment, transceiver $110_{31}$ in node $302_3$ is configured to modulate carrier wavelength $\lambda_2$ using a conventional QPSK constellation. Transceiver $110_{11}$ in node $302_1$ is configured to demodulate the modulated carrier wavelength $\lambda_2$ received from transceiver $110_{31}$ in a conventional manner to recover the bits encoded thereon and reconstruct the corresponding data stream.

In some embodiments, transceiver $110_{31}$ in node $302_3$ may be configured to modulate carrier wavelength $\lambda_2$ using a suitable hierarchical constellation.

In some embodiments, ROADM $322_1$ may be configured to operate in a drop-and-continue mode with respect to the modulated carrier wavelength $\lambda_2$ received from transceiver $110_{31}$ in node $302_3$.

In one embodiment, transceiver $110_{41}$ in node $302_4$ is configured to modulate carrier wavelength $\lambda_3$ using a conventional QPSK constellation. Transceiver $110_{22}$ in node $302_2$ is configured to demodulate the modulated carrier wavelength $\lambda_3$ received from transceiver $110_{41}$ in a conventional manner to recover the bits encoded thereon and reconstruct the corresponding data stream.

In some embodiments, transceiver $110_{4_1}$ in node $302_4$ may be configured to modulate carrier wavelength $\lambda_3$ using a suitable hierarchical constellation.

In some embodiments, ROADM $322_2$ may be configured to operate in a drop-and-continue mode with respect to the modulated carrier wavelength $\lambda_3$ received from transceiver $110_{4_1}$ in node $302_4$.

Figure 5:
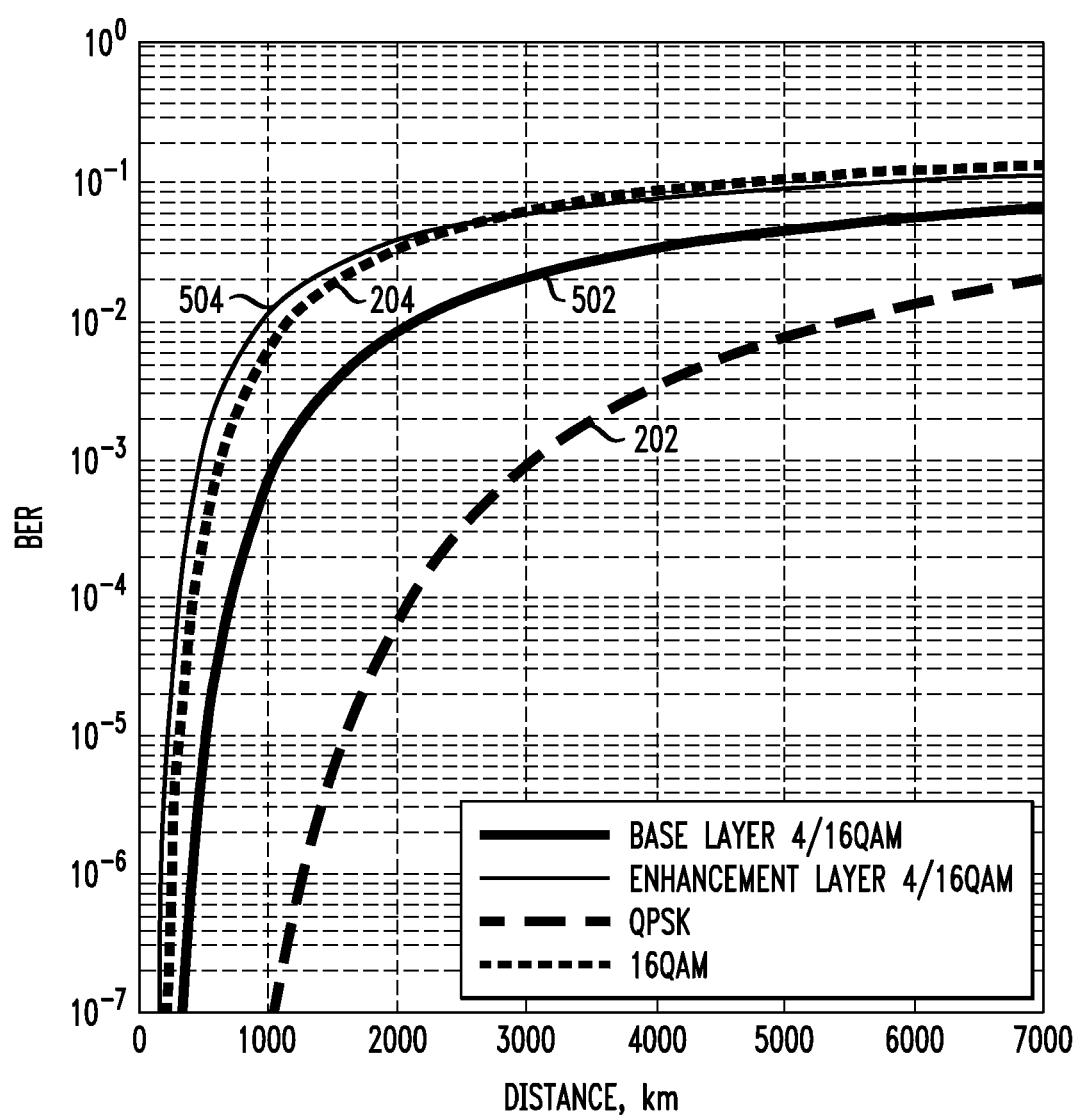
FIG. 5 graphically shows the dependence of bit error rate on the length of fiber in the fiber link for a 4/16-QAM hierarchical constellation according to an embodiment of the disclosure.

FIG. 5 graphically shows the dependence of BER on the length of fiber in the fiber link for a 4/16-QAM hierarchical constellation according to an embodiment of the disclosure. The data shown in FIG. 5 correspond to the same fiber-link characteristics as the data shown in FIG. 2. Curves 202 and 204 from FIG. 2 are reproduced in FIG. 5 as a reference. Curves 502 and 504 show the BER corresponding to the base and enhancement layers, respectively, of the aforementioned 4/16-QAM hierarchical constellation.

Curve 502 indicates that the BER for (i) the base layer of modulated carrier wavelength $\lambda_2$ received by transceiver $110_{3_1}$ from transceiver $110_{1_1}$ and (ii) the base layer of modulated carrier wavelength $\lambda_3$ received by transceiver $110_{4_1}$ from transceiver $110_{2_2}$ is approximately $2 \times 10^{-2}$ because $L_{13}=L_{24}=3000$ km. As indicated above, an example transceiver 110 can handle a BER of up to about $2 \times 10^{-2}$. This means that both transceiver $110_{4_1}$ and transceiver $110_{3_1}$ in system 300 are able to successfully recover the base bits from the respective received hierarchically modulated optical signals.

Curve 504 indicates that the BER for (i) the enhancement layer of modulated carrier wavelength $\lambda_2$ received by transceiver $110_{2_1}$ from transceiver $110_{1_1}$ and (ii) the enhancement layer of modulated carrier wavelength $\lambda_3$ received by transceiver $110_{1_2}$ from transceiver $110_{2_2}$ is approximately $10^{-2}$ because $L_{12}=1000$ km. This means that both transceiver $110_{2_1}$ and transceiver $110_{1_2}$ in system 300 are able to successfully recover the enhancement bits from the respective received hierarchically modulated optical signals.

Curve 202 indicates that the BER for (i) QPSK-modulated carrier wavelength $\lambda_2$ received by transceiver $110_{1_1}$ from transceiver $110_{3_1}$ and (ii) QPSK-modulated carrier wavelength $\lambda_3$ received by transceiver $110_{2_2}$ from transceiver $110_{4_1}$ is approximately $10^{-3}$ because $L_{13}=L_{24}=3000$ km. This means that both transceiver $110_{1_1}$ and transceiver $110_{2_2}$ in system 300 are able to successfully recover the data from the respective received QPSK-modulated optical signals.

In summary, the data shown in FIG. 5 indicate that system 300 (FIG. 3) is able to support the same optical connections and inter-node data-transport capacity as system 100 (FIG. 1). However, better utilization of the BER margins in system 300 than in system 100 enables system 300 to achieve this result with fewer carrier wavelengths. More specifically, carrier wavelength $\lambda_1$ is not used in the configuration of system 300 illustrated in FIGS. 3 and 4. As such, carrier wavelength $\lambda_1$ can advantageously be used, e.g., for transporting additional data streams (not shown in FIG. 3) in system 300.

Figure 6:
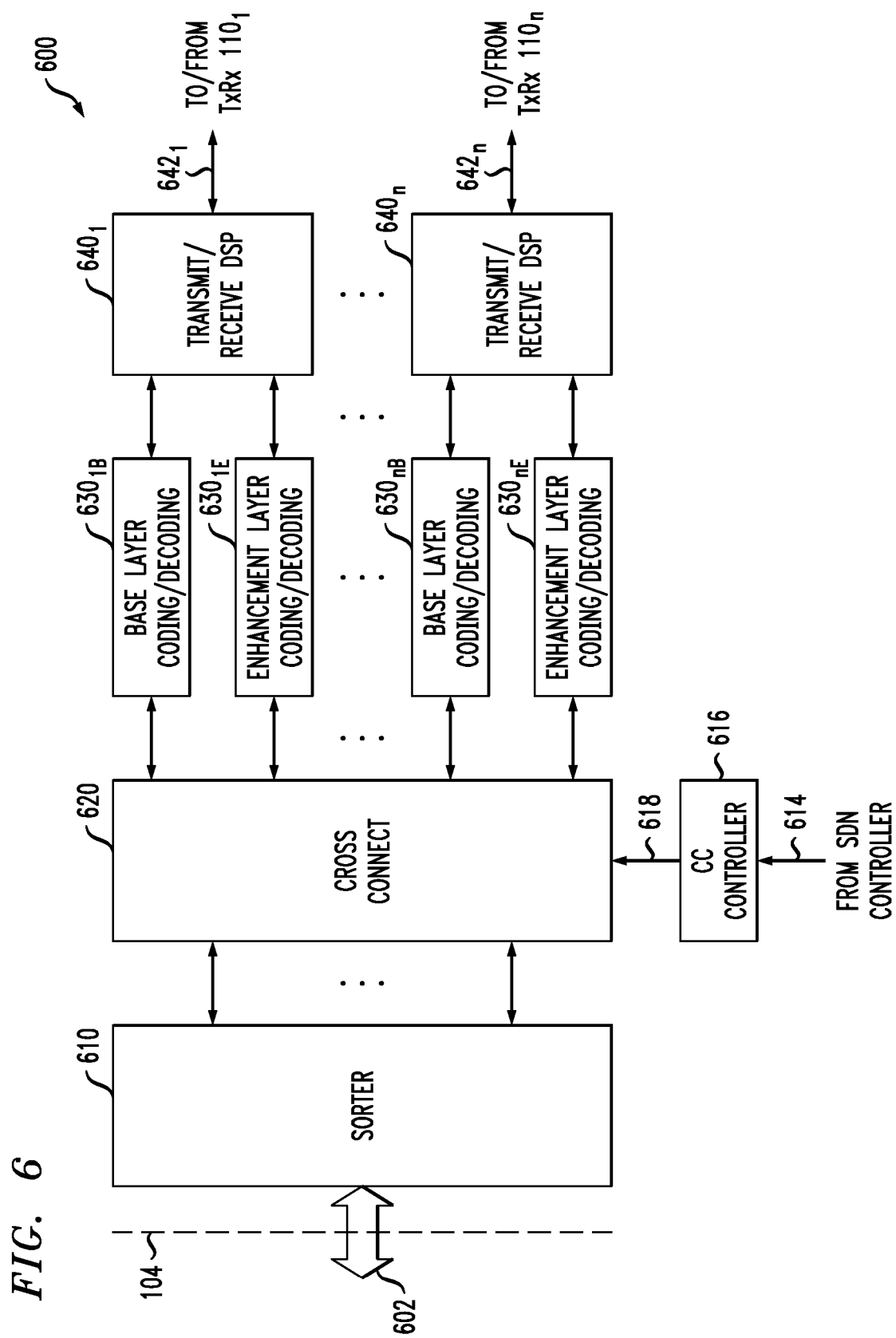
FIG. 6 shows a block diagram of a configurable hierarchical-layer mapper that can be used in the optical transport system of FIG. 3 according to an embodiment of the disclosure.

FIG. 6 shows a block diagram of a configurable hierarchical-layer mapper (CHLM) 600 that can be used as CHLM 306 (FIG. 3) according to an embodiment of the disclosure. CHLM 600 is illustratively shown in FIG. 6 as being coupled between interface 104 and transceivers $110_1$-$110_n$ (also see FIG. 3), which are not parts of the CHLM. One of ordinary skill in the art will understand that alternative couplings of CHLM 600 are also possible in some other embodiments.

CHLM 600 is designed for bidirectional operation. For the optical transmit direction, CHLM 600 directs the data flow from interface 104 to transceivers $110_1$-$110_n$. For the optical receive direction, CHLM 600 directs the data flow from transceivers $110_1$-$110_n$ to interface 104.

In an example configuration, to cause an optical transmission of the data received from various client devices through interface 104, CHLM 600 may be configured to perform the following operations.

A plurality of data streams 602 received through interface 104 from individual client devices are first applied to a sorter 610. In an example embodiment, sorter 610 may have a plurality of buffers (not explicitly shown in FIG. 6), each configured to receive and queue data frames intended for a particular network destination, such as one of nodes 302 (FIG. 3). For example, if CHLM 600 is located at node $302_1$, then sorter 610 may be configured to (i) use a first buffer therein to receive and queue data frames intended for node $302_2$, (ii) use a second buffer therein to receive and queue data frames intended for node $302_3$, etc. As such, sorter 610 operates to sort the various data frames in accordance with the destination node in system 300. In some embodiments, sorter 610 may also operate to repackage the various received data frames intended for the same destination node into new data frames that may be more suitable for an optical-transmission format used in system 300 than the originally received data-link-layer data frames.

Based on a control signal 618 generated by a cross-connect (CC) controller 616, a cross-connect switch 620 is configured to distribute the data frames from the various buffers (queues) in sorter 610 to a plurality of coding modules 630. In an example embodiment, CHLM 600 may have two coding modules 630 per transceiver 110. For example, as indicated in FIG. 6, CHLM 600 has coding modules $630_{1B}$ and $630_{1E}$ coupled to transceiver $110_1$. Coding module $630_{1B}$ is configured to encode data for transmission using the base layer of the hierarchically modulated optical signal generated by the optical transmitter in transceiver $110_1$. Coding module $630_{1E}$ is similarly configured to encode data for transmission using the enhancement layer of the hierarchically modulated optical signal generated by the optical transmitter in transceiver $110_1$. CHLM 600 also has coding modules $630_{nB}$ and $630_{nE}$ coupled to transceiver $110_n$. Coding module $630_{nB}$ is configured to encode data for transmission using the base layer of the hierarchically modulated optical signal generated by the optical transmitter in transceiver $110_n$. Coding module $630_{nE}$ is similarly configured to encode data for transmission using the enhancement layer of the hierarchically modulated optical signal generated by the optical transmitter in transceiver $110_n$. Other pairs of coding modules 630 (not explicitly shown in FIG. 6) may similarly be configured to encode data for transmission using the base and enhancement layers of the hierarchically modulated optical signals generated by other optical transceivers 110. Based on a control signal 614 received from a network controller, such as a software-defined network (SDN) controller, CC controller 616 may, from time to time, reconfigure cross-connect switch 620, as appropriate or necessary, to change connections between the various buffers in sorter 610 and the various coding modules 630.

In an example embodiment, coding module 630 may perform data encryption and also introduce data redundancies, e.g., using a suitable forward-error-correction (FEC) code. Different coding modules 630 may use different encryption codes, e.g., to prevent undesirable eavesdropping by some of the nodes in system 300. For example, node $302_2$ in system 300 (FIG. 3) can potentially eavesdrop on the transmissions intended for node $302_3$ because node $302_2$ is technically capable of receiving the base bits carried by hierarchically modulated carrier wavelength $\lambda_2$. However, when the base-layer transmissions are encrypted by CHLM $306_1$ with an encryption code "unknown" to CHLM $306_2$, such eavesdropping by node $302_2$ can be prevented.

Each of a plurality of digital signal processors (DSPs) $640_1$-$640_n$ operates to convert the streams of encoded data generated by the corresponding pair of coding modules 630 into a respective one of digital waveforms $642_1$-$642_n$ that can then be used to generate an appropriate analog drive signal for driving an optical transmitter in the corresponding one of transceivers $110_1$-$110_n$. For example, digital waveform $642_1$ generated by DSP $640_1$ is such that it causes the optical transmitter in transceiver $110_1$ to generate a hierarchically modulated optical signal, wherein the base layer carries the data stream generated by coding module $630_{1B}$, and the enhancement layer carries the data stream generated by coding module $630_{1E}$. Similarly, digital waveform $642_n$ generated by DSP $640_n$ is such that it causes the optical transmitter in transceiver $110_n$ to generate a hierarchically modulated optical signal, wherein the base layer carries the data stream generated by coding module $630_{nB}$, and the enhancement layer carries the data stream generated by coding module $630_{nE}$.

In an example configuration, to provide data optically received from other nodes 302 in system 300 to various client devices connected to CHLM 600 via interface 104, CHLM 600 may be configured to perform the following operations.

Each of a plurality of DSPs $640_1$-$640_n$ operates to recover the encoded data carried by one or both of the base and enhancement layers of a hierarchically modulated optical signal received by an optical receiver in the corresponding one of transceivers $110_1$-$110_n$. For example, DSP $640_1$ may recover the base and enhancement bits by processing, as known in the art, digital waveform $642_1$ generated by the optical receiver in transceiver $110_1$ in response to the corresponding received hierarchically modulated optical signal. DSP $640_1$ then directs the recovered base bits to coding module $630_{1B}$, and directs the recovered enhancement bits to coding module $630_{1E}$. In some instances, DSP $640_1$ may be able to recover only the base bits, but not the enhancement bits. DSP $640_n$ operates in a similar manner by processing digital waveform $642_n$.

Each coding module 630 operates to correct any errors that might be present in the data streams recovered by the corresponding DSP 640, e.g., based on the data redundancies introduced by the FEC code used at the transmitter side. Coding module 630 then decrypts the resulting corrected data streams to recover the corresponding original source data streams. The recovered data are then directed to cross-connect switch 620 whose configuration is set by CC controller 616 based on the instructions 614 received from the corresponding network controller. Cross-connect switch 620 and sorter 610 operate to appropriately sort and distribute the recovered data among the client devices connected to interface 104.

From the provided description, one of ordinary skill in the art will understand how to modify CHLM 600 to adapt it to hierarchical-modulation formats that employ more than one enhancement layer.

According to an example embodiment disclosed above in reference to FIGS. 1-6, provided is a system comprising: a first node (e.g., $302_1$, FIG. 3) configured to generate, for transmission over an optical path (e.g., 120, FIG. 3), a first hierarchically modulated optical signal having a base layer and an enhancement layer; and a second node (e.g., $302_2$, FIG. 3) configured to generate, for transmission over the optical path, a second hierarchically modulated optical signal having a base layer and an enhancement layer. The first node is further configured to receive data from the second node by demodulating and decoding either the base layer or the enhancement layer of the second hierarchically modulated optical signal. The second node is further configured to receive data from the first node by demodulating and decoding either the base layer or the enhancement layer of the first hierarchically modulated optical signal.

In some embodiments of the above system, the first hierarchically modulated optical signal has a first carrier wavelength (e.g., $\lambda_2$, FIGS. 3-4); and the second hierarchically modulated optical signal has a second carrier wavelength (e.g., $\lambda_3$, FIGS. 3-4).

In some embodiments of any of the above systems, the system further comprises a third node (e.g., $302_3$, FIG. 3), wherein: the optical path has a greater length of fiber between the first node and the third node than between the first node and the second node; the second node is configured to receive data from the first node by demodulating and decoding the enhancement layer of the first hierarchically modulated optical signal; and the third node is configured to receive data from the first node by demodulating and decoding the base layer of the first hierarchically modulated optical signal.

In some embodiments of any of the above systems, the third node is incapable of receiving data from the first node by demodulating and decoding the enhancement layer of the first hierarchically modulated optical signal due to an insufficient signal-to-noise ratio corresponding to the enhancement layer of the first hierarchically modulated optical signal at the third node.

In some embodiments of any of the above systems, the third node is configured to generate, for transmission over the optical path, a first non-hierarchically modulated optical signal; and the first node is configured to receive data from the third node by demodulating and decoding the first non-hierarchically modulated optical signal.

In some embodiments of any of the above systems, the first hierarchically modulated optical signal has a first carrier wavelength (e.g., $\lambda_2$, FIGS. 3-4); the second hierarchically modulated optical signal has a second carrier wavelength (e.g., $\lambda_3$, FIGS. 3-4); and the first non-hierarchically modulated optical signal has the first carrier wavelength (see, e.g., FIG. 4).

In some embodiments of any of the above systems, the system further comprises a fourth node (e.g., $302_4$, FIG. 3), wherein: the optical path has a greater length of fiber between the second node and the fourth node than between the first node and the second node; the first node is configured to receive data from the second node by demodulating and decoding the enhancement layer of the second hierarchically modulated optical signal; and the fourth node is configured to receive data from the second node by demodulating and decoding the base layer of the second hierarchically modulated optical signal.

In some embodiments of any of the above systems, the third node is configured to generate, for transmission over the optical path, a first non-hierarchically modulated optical signal; the first node is configured to receive data from the third node by demodulating and decoding the first non-hierarchically modulated optical signal; the fourth node is configured to generate, for transmission over the optical path, a second non-hierarchically modulated optical signal; and the second node is configured to receive data from the fourth node by demodulating and decoding the second non-hierarchically modulated optical signal.

In some embodiments of any of the above systems, the first hierarchically modulated optical signal has a first carrier wavelength (e.g., $\lambda_2$, FIGS. 3-4); the second hierarchically modulated optical signal has a second carrier wavelength (e.g., $\lambda_3$, FIGS. 3-4); the first non-hierarchically modulated optical signal has the first carrier wavelength (see, e.g., FIG. 4); and the second non-hierarchically modulated optical signal has the second carrier wavelength (see, e.g., FIG. 4).

In some embodiments of any of the above systems, the first node comprises a first ROADM (e.g., $322_1$, FIG. 3) configured to operate in a drop-and-continue mode with respect to the second hierarchically modulated optical signal.

In some embodiments of any of the above systems, the second node comprises a second ROADM (e.g., $322_2$, FIG. 3) configured to operate in a drop-and-continue mode with respect to the first hierarchically modulated optical signal.

In some embodiments of any of the above systems, the system further comprises a third node (e.g., $302_3$, FIG. 3) configured to generate, for transmission over the optical path, a third modulated optical signal. The first ROADM is configured to drop the third modulated optical signal from the optical path without allowing the third modulated optical signal to continue to propagate along the optical path past the first node.

In some embodiments of any of the above systems, the first node is configured to receive data from the third node by demodulating and decoding the third modulated optical signal dropped from the optical path by the first ROADM.

In some embodiments of any of the above systems, the third modulated optical signal is a third hierarchically modulated optical signal.

In some embodiments of any of the above systems, the system further comprises a third node (e.g., $302_3$, FIG. 3) configured to generate, for transmission over the optical path, a third hierarchically modulated optical signal. The first ROADM is configured to operate in a drop-and-continue mode with respect to the third hierarchically modulated optical signal.

In some embodiments of any of the above systems, the drop-and-continue mode causes the first ROADM to: direct a first portion of optical power of the second hierarchically modulated optical signal from the optical path to an optical receiver (e.g., $110_{12}$, FIG. 3) in the first node; and allow a second portion of the optical power of the second hierarchically modulated optical signal to continue to propagate along the optical path past the first node.

In some embodiments of any of the above systems, the first node comprises: a sorter (e.g., 610, FIG. 6) configured to sort data frames received for transmission over the optical path in accordance with destination; and a cross-connect switch (e.g., 620, FIG. 6) configured to distribute the data frames sorted by the sorter to a plurality of coding modules (e.g., 630, FIG. 6). The cross-connect switch is further configured to: direct the data frames having a first destination to a first coding module (e.g., $630_{1B}$, FIG. 6) of the plurality of coding modules, said first coding module being configured to encode the data frames directed thereto by the cross-connect switch for transmission over the optical path using a base layer of a designated hierarchically modulated optical signal; and direct the data frames having a second destination to a second coding module (e.g., $630_{1E}$, FIG. 6) of the plurality of coding modules, said second coding module being configured to encode the data frames directed thereto by the cross-connect switch for transmission over the optical path using an enhancement layer of the designated hierarchically modulated optical signal.

In some embodiments of any of the above systems, the system further comprises a third node (e.g., $302_3$, FIG. 3), wherein: the optical path has a greater length of fiber between the first node and the third node than between the first node and the second node; the designated hierarchically modulated optical signal is the first hierarchically modulated optical signal; the third node is the first destination; and the second node is the second destination.

In some embodiments of any of the above systems, the first node further comprises an electronic controller (e.g., 616, FIG. 6) configured to cause the cross-connect switch to direct to the first coding module the data frames having a third destination instead of the data frames having the first destination.

In some embodiments of any of the above systems, the first node further comprises an electronic controller (e.g., 616, FIG. 6) configured to cause the cross-connect switch to direct to the second coding module the data frames having a third destination instead of the data frames having the second destination.

According to another example embodiment disclosed above in reference to FIGS. 1-6, provided is an apparatus (e.g., 302, FIG. 3) comprising: a sorter (e.g., 610, FIG. 6) configured to sort data frames received for transmission over an optical path (e.g., 120, FIG. 3) into a plurality of queues, each of said queues corresponding to a respective destination node coupled to the apparatus through the optical path; a cross-connect switch (e.g., 620, FIG. 6) configured to distribute the data frames from the plurality of queues among a plurality of coding modules (e.g., 630, FIG. 6); a first coding module (e.g., $630_{1B}$, FIG. 6) of the plurality of coding modules configured to encode the data frames directed thereto by the cross-connect switch for transmission over the optical path using a base layer of a hierarchically modulated optical signal; a second coding module (e.g., $630_{1E}$, FIG. 6) of the plurality of coding modules configured to encode the data frames directed thereto by the cross-connect switch for transmission over the optical path using an enhancement layer of the hierarchically modulated optical signal; and an electronic controller (e.g., 616, FIG. 6) configured to cause the cross-connect switch to change a queue in the plurality of queues from which either the first coding module or the second coding module receives the data frames for encoding.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

What is claimed is:

1. A system comprising:
   a first node configured to generate, for transmission over an optical path, a first hierarchically modulated optical signal having a base layer and an enhancement layer; and
   a second node configured to generate, for transmission over the optical path, a second hierarchically modulated optical signal having a base layer and an enhancement layer, wherein:
     the first node is further configured to receive data from the second node by demodulating and decoding either the base layer or the enhancement layer of the second hierarchically modulated optical signal; and
     the second node is further configured to receive data from the first node by demodulating and decoding either the base layer or the enhancement layer of the first hierarchically modulated optical signal;
   wherein the first node comprises:
     a sorter configured to sort data frames received for transmission over the optical path in accordance with destination; and
     a cross-connect switch configured to distribute the data frames sorted by the sorter to a plurality of coding modules; and
   wherein the cross-connect switch is further configured to:
     direct the data frames having a first destination to a first coding module of the plurality of coding modules, said first coding module being configured to encode the data frames directed thereto by the cross-connect switch for transmission over the optical path using a base layer of a designated hierarchically modulated optical signal; and
     direct the data frames having a second destination to a second coding module of the plurality of coding modules, said second coding module being configured to encode the data frames directed thereto by the cross-connect switch for transmission over the optical path using an enhancement layer of the designated hierarchically modulated optical signal.

2. The system of claim 1, wherein:
   the first hierarchically modulated optical signal has a first carrier wavelength; and
   the second hierarchically modulated optical signal has a second carrier wavelength.

3. The system of claim 1, further comprising a third node, wherein:
   the optical path has a greater length of fiber between the first node and the third node than between the first node and the second node;
   the second node is configured to receive data from the first node by demodulating and decoding the enhancement layer of the first hierarchically modulated optical signal; and
   the third node is configured to receive data from the first node by demodulating and decoding the base layer of the first hierarchically modulated optical signal.

4. The system of claim 3, wherein the third node is incapable of receiving data from the first node by demodulating and decoding the enhancement layer of the first hierarchically modulated optical signal due to an insufficient signal-to-noise ratio corresponding to the enhancement layer of the first hierarchically modulated optical signal at the third node.

5. The system of claim 3, wherein:
   the third node is configured to generate, for transmission over the optical path, a first non-hierarchically modulated optical signal; and
   the first node is configured to receive data from the third node by demodulating and decoding the first non-hierarchically modulated optical signal.

6. The system of claim 5, wherein:
the first hierarchically modulated optical signal has a first carrier wavelength;
the second hierarchically modulated optical signal has a second carrier wavelength; and
the first non-hierarchically modulated optical signal has the first carrier wavelength.

7. The system of claim 3, further comprising a fourth node, wherein:
the optical path has a greater length of fiber between the second node and the fourth node than between the first node and the second node;
the first node is configured to receive data from the second node by demodulating and decoding the enhancement layer of the second hierarchically modulated optical signal; and
the fourth node is configured to receive data from the second node by demodulating and decoding the base layer of the second hierarchically modulated optical signal.

8. The system of claim 7, wherein:
the third node is configured to generate, for transmission over the optical path, a first non-hierarchically modulated optical signal;
the first node is configured to receive data from the third node by demodulating and decoding the first non-hierarchically modulated optical signal;
the fourth node is configured to generate, for transmission over the optical path, a second non-hierarchically modulated optical signal; and
the second node is configured to receive data from the fourth node by demodulating and decoding the second non-hierarchically modulated optical signal.

9. The system of claim 1, wherein the first node comprises a first ROADM configured to operate in a drop-and-continue mode with respect to the second hierarchically modulated optical signal.

10. The system of claim 9, wherein the second node comprises a second ROADM configured to operate in a drop-and-continue mode with respect to the first hierarchically modulated optical signal.

11. The system of claim 9, further comprising a third node configured to generate, for transmission over the optical path, a third modulated optical signal; and
wherein the first ROADM is configured to drop the third modulated optical signal from the optical path without allowing the third modulated optical signal to continue to propagate along the optical path past the first node.

12. The system of claim 11, wherein the first node is configured to receive data from the third node by demodulating and decoding the third modulated optical signal dropped from the optical path by the first ROADM.

13. The system of claim 11, wherein the third modulated optical signal is a third hierarchically modulated optical signal.

14. The system of claim 9, further comprising a third node configured to generate, for transmission over the optical path, a third hierarchically modulated optical signal; and
wherein the first ROADM is configured to operate in a drop-and-continue mode with respect to the third hierarchically modulated optical signal.

15. The system of claim 9, wherein the drop-and-continue mode causes the first ROADM to:
direct a first portion of optical power of the second hierarchically modulated optical signal from the optical path to an optical receiver in the first node; and
allow a second portion of the optical power of the second hierarchically modulated optical signal to continue to propagate along the optical path past the first node.

16. The system of claim 1, further comprising a third node, wherein:
the optical path has a greater length of fiber between the first node and the third node than between the first node and the second node;
the designated hierarchically modulated optical signal is the first hierarchically modulated optical signal;
the third node is the first destination; and
the second node is the second destination.

17. The system of claim 1, wherein the first node further comprises an electronic controller configured to cause the cross-connect switch to direct to the first coding module the data frames having a third destination instead of the data frames having the first destination.

18. The system of claim 1, wherein the first node further comprises an electronic controller configured to cause the cross-connect switch to direct to the second coding module the data frames having a third destination instead of the data frames having the second destination.

19. An apparatus comprising:
a sorter configured to sort data frames received for transmission over an optical path into a plurality of queues, each of said queues corresponding to a respective destination node coupled to the apparatus through the optical path;
a cross-connect switch configured to distribute the data frames from the plurality of queues among a plurality of coding modules;
a first coding module of the plurality of coding modules configured to encode the data frames directed thereto by the cross-connect switch for transmission over the optical path using a base layer of a hierarchically modulated optical signal;
a second coding module of the plurality of coding modules configured to encode the data frames directed thereto by the cross-connect switch for transmission over the optical path using an enhancement layer of the hierarchically modulated optical signal; and
an electronic controller configured to cause the cross-connect switch to change a queue in the plurality of queues from which either the first coding module or the second coding module receives the data frames for encoding.

20. A system comprising:
a first node configured to generate, for transmission over an optical path, a first hierarchically modulated optical signal having a base layer and an enhancement layer; and
a second node configured to generate, for transmission over the optical path, a second hierarchically modulated optical signal having a base layer and an enhancement layer, wherein:
the first node is further configured to receive data from the second node by demodulating and decoding either the base layer or the enhancement layer of the second hierarchically modulated optical signal; and
the second node is further configured to receive data from the first node by demodulating and decoding either the base layer or the enhancement layer of the first hierarchically modulated optical signal; and
wherein the system further comprises a third node;
wherein the optical path has a greater length of fiber between the first node and the third node than between the first node and the second node;

wherein the second node is configured to receive data from the first node by demodulating and decoding the enhancement layer of the first hierarchically modulated optical signal; and wherein the third node is configured to receive data from the first node by demodulating and decoding the base layer of the first hierarchically modulated optical signal.

21. The system of claim 20, wherein the third node is incapable of receiving data from the first node by demodulating and decoding the enhancement layer of the first hierarchically modulated optical signal due to an insufficient signal-to-noise ratio corresponding to the enhancement layer of the first hierarchically modulated optical signal at the third node.

22. The system of claim 20, wherein:

the third node is configured to generate, for transmission over the optical path, a first non-hierarchically modulated optical signal; and the first node is configured to receive data from the third node by demodulating and decoding the first non-hierarchically modulated optical signal.

23. The system of claim 22, wherein:

the first hierarchically modulated optical signal has a first carrier wavelength;

the second hierarchically modulated optical signal has a second carrier wavelength; and the first non-hierarchically modulated optical signal has the first carrier wavelength.

24. The system of claim 20, further comprising a fourth node, wherein:

the optical path has a greater length of fiber between the second node and the fourth node than between the first node and the second node;

the first node is configured to receive data from the second node by demodulating and decoding the enhancement layer of the second hierarchically modulated optical signal; and the fourth node is configured to receive data from the second node by demodulating and decoding the base layer of the second hierarchically modulated optical signal.

25. The system of claim 24, wherein:

the third node is configured to generate, for transmission over the optical path, a first non-hierarchically modulated optical signal;

the first node is configured to receive data from the third node by demodulating and decoding the first non-hierarchically modulated optical signal;

the fourth node is configured to generate, for transmission over the optical path, a second non-hierarchically modulated optical signal; and the second node is configured to receive data from the fourth node by demodulating and decoding the second non-hierarchically modulated optical signal.

* * * * *